(12) United States Patent
Elmachtoub et al.

(10) Patent No.: US 11,151,604 B2
(45) Date of Patent: Oct. 19, 2021

(54) REVENUE MANAGEMENT USING DYNAMIC CUSTOMER SELECTION

(71) Applicant: International Business Machines Corporation, Armonk, NY (US)

(72) Inventors: Adam N. Elmachtoub, Yorktown Heights, NY (US); Roger D. Lederman, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 614 days.

(21) Appl. No.: 15/179,271

(22) Filed: Jun. 10, 2016

(65) Prior Publication Data

US 2017/0358001 A1 Dec. 14, 2017

(51) Int. Cl.
*G06Q 30/02* (2012.01)

(52) U.S. Cl.
CPC ..... *G06Q 30/0247* (2013.01); *G06Q 30/0264* (2013.01)

(58) Field of Classification Search
CPC ........................................ G06Q 30/0207–0277
USPC ................................................. 705/14, 14.24
See application file for complete search history.

(56) References Cited

U.S. PATENT DOCUMENTS

| | | | | |
|---|---|---|---|---|
| 6,061,658 A * | 5/2000 | Chou | ..................... | G06Q 30/02 705/14.46 |
| 6,569,011 B1 * | 5/2003 | Lynch | ..................... | A63F 13/12 463/1 |
| 6,643,556 B1 * | 11/2003 | Morenz | ................... | G06Q 10/06 700/106 |
| 7,155,402 B1 * | 12/2006 | Dvorak | ............ | G06Q 10/06315 705/14.41 |
| 7,263,496 B1 * | 8/2007 | Weigelt | .................. | G06Q 10/06 705/7.25 |
| 7,346,518 B1 * | 3/2008 | Frank | ................... | G06Q 10/063 705/310 |
| 7,379,890 B2 * | 5/2008 | Myr | ................. | G06Q 10/06375 705/7.35 |
| 7,386,460 B1 * | 6/2008 | Frank | ..................... | G06Q 10/10 705/310 |

(Continued)

FOREIGN PATENT DOCUMENTS

WO WO2013023295 A1 2/2013

OTHER PUBLICATIONS

Robert Swinney, Inventory Pooling with Strategic Consumers Operational and Behavioral Benefits, Sep. 2011 (Year: 2011).*

(Continued)

*Primary Examiner* — Gautam Ubale
(74) *Attorney, Agent, or Firm* — Cantor Colburn LLP; Joseph Petrokaitis (57) ABSTRACT

Systems, methods, and computer-readable media for controlling the timing of customer interactions (e.g., targeted product or service offerings to customers) in order to determine optimally efficient usage of a seller's available inventory are disclosed. A customer selection problem (CSP) may be formulated and solved to implement a customer selection policy for controlling the timing with which customers from a customer pool will be targeted with offerings. The customer selection policy may include dynamic optimization to account for intertemporal effects of customer decisions.

11 Claims, 6 Drawing Sheets

(56) References Cited

U.S. PATENT DOCUMENTS

| | | | | |
|---|---|---|---|---|
| 7,912,748 B1* | 3/2011 | Rosenberg | G06Q 10/087 | 705/7.35 |
| 8,078,506 B1* | 12/2011 | Rao | H04Q 11/0005 | 705/27.2 |
| 8,078,507 B1* | 12/2011 | Rao | H04W 80/04 | 705/27.2 |
| 8,200,532 B2* | 6/2012 | Murphy | G06Q 30/0234 | 705/14.15 |
| 8,412,572 B2* | 4/2013 | Cosman | G06Q 30/0202 | 705/14.4 |
| 8,533,048 B2* | 9/2013 | Charania | G06Q 30/0247 | 705/14.69 |
| 9,805,402 B1* | 10/2017 | Maurer | G06Q 10/087 | |
| 2001/0007100 A1* | 7/2001 | Revashetti | G06Q 30/02 | 709/224 |
| 2001/0032128 A1* | 10/2001 | Kepecs | G06Q 30/02 | 705/14.13 |
| 2001/0049652 A1* | 12/2001 | Nakajima | G06Q 30/08 | 705/37 |
| 2002/0065699 A1* | 5/2002 | Talluri | G06Q 10/06315 | 705/7.25 |
| 2004/0044493 A1* | 3/2004 | Coulthard | G16H 40/63 | 702/122 |
| 2004/0230475 A1* | 11/2004 | Dogan | G06Q 10/06315 | 705/7.31 |
| 2005/0033706 A1* | 2/2005 | Krikler | G06Q 30/0207 | 705/400 |
| 2005/0060242 A1* | 3/2005 | Armstrong | G06Q 10/087 | 705/28 |
| 2005/0189414 A1* | 9/2005 | Fano | G06Q 30/0255 | 235/383 |
| 2006/0080135 A1* | 4/2006 | Frank | G06Q 10/06313 | 705/310 |
| 2006/0085220 A1* | 4/2006 | Frank | G06Q 30/02 | 705/310 |
| 2007/0130090 A1* | 6/2007 | Staib | G06Q 30/0222 | 705/400 |
| 2007/0270990 A1* | 11/2007 | Katircioglu | G06Q 10/06 | 700/99 |
| 2008/0010319 A1* | 1/2008 | Vonarburg | G06F 16/95 | |
| 2008/0082427 A1* | 4/2008 | Gandhi | G06Q 10/087 | 705/28 |
| 2008/0133387 A1* | 6/2008 | Zalta | G06Q 30/02 | 705/32 |
| 2008/0134205 A1* | 6/2008 | Bansal | G06F 11/3447 | 719/315 |
| 2008/0134209 A1* | 6/2008 | Bansal | H04L 67/02 | 719/317 |
| 2009/0234710 A1* | 9/2009 | Belgaied Hassine | G06Q 30/0206 | 705/7.29 |
| 2010/0010875 A1* | 1/2010 | Armstrong | G06Q 10/0875 | 705/7.37 |
| 2010/0049535 A1* | 2/2010 | Chari | G06Q 30/02 | 705/14.43 |
| 2011/0100504 A1* | 5/2011 | Saranow | G06Q 30/0635 | 141/83 |
| 2011/0112889 A1* | 5/2011 | Ettl | G06Q 30/0202 | 705/7.31 |
| 2011/0112899 A1* | 5/2011 | Strutton | G06Q 30/0251 | 705/14.41 |
| 2011/0283263 A1* | 11/2011 | Gagliardi | G06F 11/3612 | 717/130 |
| 2011/0283264 A1* | 11/2011 | Gagliardi | G06F 11/3644 | 717/130 |
| 2011/0283265 A1* | 11/2011 | Gagliardi | G06F 11/3495 | 717/130 |
| 2011/0313848 A1* | 12/2011 | Vaidyanathan | G06Q 30/0276 | 705/14.43 |
| 2012/0158485 A1* | 6/2012 | Ogawa | G06Q 30/0242 | 705/14.42 |
| 2012/0158553 A1* | 6/2012 | Sudhidhanakul | G06Q 10/087 | 705/28 |
| 2013/0018830 A1* | 1/2013 | Dhurandhar | G06N 7/005 | 706/14 |
| 2013/0297380 A1* | 11/2013 | Godsey | G06Q 30/0202 | 705/7.31 |
| 2013/0325558 A1* | 12/2013 | Rosenberg | G06Q 30/0206 | 705/7.35 |
| 2014/0067518 A1* | 3/2014 | McGovern | G06Q 30/0242 | 705/14.41 |
| 2014/0141462 A1* | 5/2014 | Perree | G01N 33/5044 | 435/29 |
| 2014/0164046 A1* | 6/2014 | Haralambos | G06Q 20/18 | 705/7.25 |
| 2014/0164174 A1* | 6/2014 | Kitlyar | G06Q 30/0633 | 705/26.8 |
| 2014/0207509 A1* | 7/2014 | Yu | G06Q 10/1095 | 705/7.19 |
| 2014/0222555 A1* | 8/2014 | Dass | G06Q 30/0247 | 705/14.46 |
| 2014/0289167 A1* | 9/2014 | Rosenberg | G06Q 30/0283 | 705/400 |
| 2014/0310030 A1* | 10/2014 | Cheranda | G06Q 10/02 | 705/5 |
| 2015/0066569 A1* | 3/2015 | Ervolina | G06Q 10/06315 | 705/7.25 |
| 2015/0100465 A1* | 4/2015 | Dornbush | G06Q 10/087 | 705/28 |
| 2015/0178746 A1* | 6/2015 | Tiwari | G06Q 30/0629 | 705/7.31 |
| 2015/0348083 A1* | 12/2015 | Brill | G06Q 20/386 | 705/14.23 |
| 2015/0371283 A1* | 12/2015 | Chevrier | G06Q 30/0269 | 705/14.66 |
| 2016/0005063 A1* | 1/2016 | Zimmerman | G06Q 30/0276 | 705/7.35 |
| 2016/0027056 A1* | 1/2016 | Taslimi | G06F 16/9537 | 705/14.45 |
| 2017/0091790 A1* | 3/2017 | Ray | G06Q 10/087 | |
| 2017/0200180 A1* | 7/2017 | Kannan | G06Q 10/087 | |
| 2017/0337505 A1* | 11/2017 | Chittilappilly | G06N 5/04 | |
| 2018/0144290 A1* | 5/2018 | Alvo | G06Q 10/087 | |

OTHER PUBLICATIONS

Brenda Dietrich, "Optimizing the end-to-end value chain through demand shaping and advanced customer analytics" Computer Aided Chemical Engineering 31 (2012): 8-18 (Year: 2012).*

Inventory Pooling with Strategic Consumers Operational and Behavioral Benefits, Robert Swinney (Year: 2011).*

Data-Mining-Enhanced Agents in Dynamic Supply-Chain-Management Environments (Year: 2013).*

Monetizing the Cloud—Pricing Model Governance (Year: 2009).*

Resonance Marketing in the Age of the Truly Informed Consumer (Year: 2008).*

Automatic Management of On-Line Inventory for Enhancing Commerce Opportunities (Year: 2008).*

Customers' Preferences for Infrastructure Cloud Services (Year: 2010).*

Optimizing the end-to-end value chain through demand shaping and advanced customer analytics (Year: 2012).*

Aydin, Goker et al., "Personalized Dynamic Pricing of Limited Inventories," Operations Research 57 (2009), pp. 1523-1531.

Bernstein, P.A., et al., "Dynamic Assortment Customization With Limited Inventories," Manufacturing and Service Operations Management 17(4), 2015, pp. 538-553.

Golrezaei, Negin et al., "Real-Time Optimization of Personalized Assortments," Management Science 60(6), 2014, pp. 1532-1551.

* cited by examiner

REVENUE MANAGEMENT USING DYNAMIC CUSTOMER SELECTION

BACKGROUND

Revenue management (RM) refers to the use of various tools by a seller to influence customer decisions such that resulting customer purchases most efficiently consume the seller's available inventory. Various RM techniques seek to achieve inventory balance by controlling product availability and/or product price to target an optimal mix of customers with the goal of maximizing revenues from inventory. However, existing RM techniques suffer from a number of drawbacks such as, for example, reliance on traditional sales channels and failure to account for the myriad of channels for customer engagement available in today's marketplace. Technical solutions that address these and other drawbacks of existing RM techniques are described herein.

SUMMARY

In one or more example embodiments of the disclosure, a method is disclosed that includes determining a customer pool comprising a plurality of customers and determining an inventory comprising a plurality of products or services. The method further includes selecting a first customer from the customer pool to target with a first product or service offering during a first time period of a plurality of time periods, where selecting the first customer includes determining that selecting the first customer to target during the first time period optimizes allocation of the inventory across the plurality of time periods. The method additionally includes causing the first customer to be targeted with the first product or service offering during the first time period, determining a customer outcome associated with offering the first product or service offering to the first customer, and selecting, based at least in part on the customer outcome, a second customer from the customer pool to target with a second product or service offering during a second time period of the plurality of time periods, where the second time period is subsequent to the first time period.

In one or more other example embodiments of the disclosure, a system is disclosed that includes at least one memory storing computer-executable instructions and at least one processor configured to access the at least one memory and execute the computer-executable instructions to perform a set of operations. The operations include determining a customer pool that includes a plurality of customers and determining an inventory that includes a plurality of products or services. The operations further include selecting a first customer from the customer pool to target with a first product or service offering during a first time period of a plurality of time periods, where selecting the first customer includes determining that selecting the first customer to target during the first time period optimizes allocation of the inventory across the plurality of time periods. The operations further include causing the first customer to be targeted with the first product or service offering during the first time period, determining a customer outcome associated with offering the first product or service offering to the first customer, and selecting, based at least in part on the customer outcome, a second customer from the customer pool to target with a second product or service offering during a second time period of the plurality of time periods, where the second time period is subsequent to the first time period.

In one or more other example embodiments of the disclosure, a computer program product is disclosed that comprises a non-transitory storage medium readable by a processing circuit, the storage medium storing instructions executable by the processing circuit to cause a method to be performed. The method includes determining customer pool that includes a plurality of customers and determining an inventory that includes a plurality of products or services. The method further includes selecting a first customer from the customer pool to target with a first product or service offering during a first time period of a plurality of time periods, where selecting the first customer includes determining that selecting the first customer to target during the first time period optimizes allocation of the inventory across the plurality of time periods. The method additionally includes causing the first customer to be targeted with the first product or service offering during the first time period, determining a customer outcome associated with offering the first product or service offering to the first customer, and selecting, based at least in part on the customer outcome, a second customer from the customer pool to target with a second product or service offering during a second time period of the plurality of time periods, where the second time period is subsequent to the first time period.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for controlling the timing of customer interactions (e.g., targeted product offerings to customers) in order to induce optimally efficient usage of a seller's available inventory. In certain example embodiments, a customer selection problem (CSP) may be formulated as a recursively defined dynamic CSP. A solution to the recursive CSP may be approximated by: 1) solving, based at least in part on a set of constraints and a set of parameters, a deterministic customer selection linear program (CSLP) for a current time period of a plurality of time periods over a time horizon to obtain a set of Lagrange multipliers ($\lambda_j$s) for the current time period, where each $\lambda_j$ represents an incremental value of a unit of inventory for a corresponding product j in an inventory, 2) computing expected adjusted revenues for each product in the inventory, and 3) selecting a customer from a set of candidate customers that maximizes expected adjusted revenues across all products in the inventory. A product offering may then be provided to the selected customer, and at least one constraint and/or at least one parameter may be adjusted based on the outcome of the product offering made to the selected customer. The above process may then be repeated for each subsequent time period of the time horizon until a respective customer has been selected for each time period. It should be appreciated that the offered product may be a physical product, a consumable product (e.g., digital media), or a service (e.g., hotel accommodation, airline flight, etc.). Accordingly, the term product is used generically herein to connote any suitable product or service.

Example embodiments of the disclosure provide a seller who is engaged in active marketing with its customer base with the capability to take inventory positions into account when controlling the timing of customer marketing actions. More specifically, utilizing the teachings of the disclosure a seller is able to control not only the marketing actions that are taken with respect to a specific customer, but also the timing of these actions so that the seller is able to achieve optimally efficient use of inventory. In order to achieve this coordination between the timing of customer marketing actions and efficient use of available inventory, example embodiments of the disclosure implement a customer selection policy that is obtained by solving a novel formulation of an RM optimization problem that incorporates dynamic active marketing capabilities.

Example embodiments of the disclosure provide a formulation to a dynamic optimization problem whose solution allows a seller to strategically select the order in which customers are approached with marketing messaging and/or product sales offers so as to induce the most favorable usage of available inventory. Because the dynamic optimization problem is difficult to solve, example embodiments of the disclosure provide an approximation of the solution that achieves a high level of performance under testing scenarios.

Conventional RM systems are based on an assumption of passive sales, and thus, their decision making is limited to the opening and closing of fare classes, and possibly, the adjustment of prices. In contrast, example embodiments of the disclosure provide a seller with the ability to control the order in which customers are targeted, and thus, provide several advantages relating to efficient use of available inventory that conventional RM systems do not.

Figure 1A:
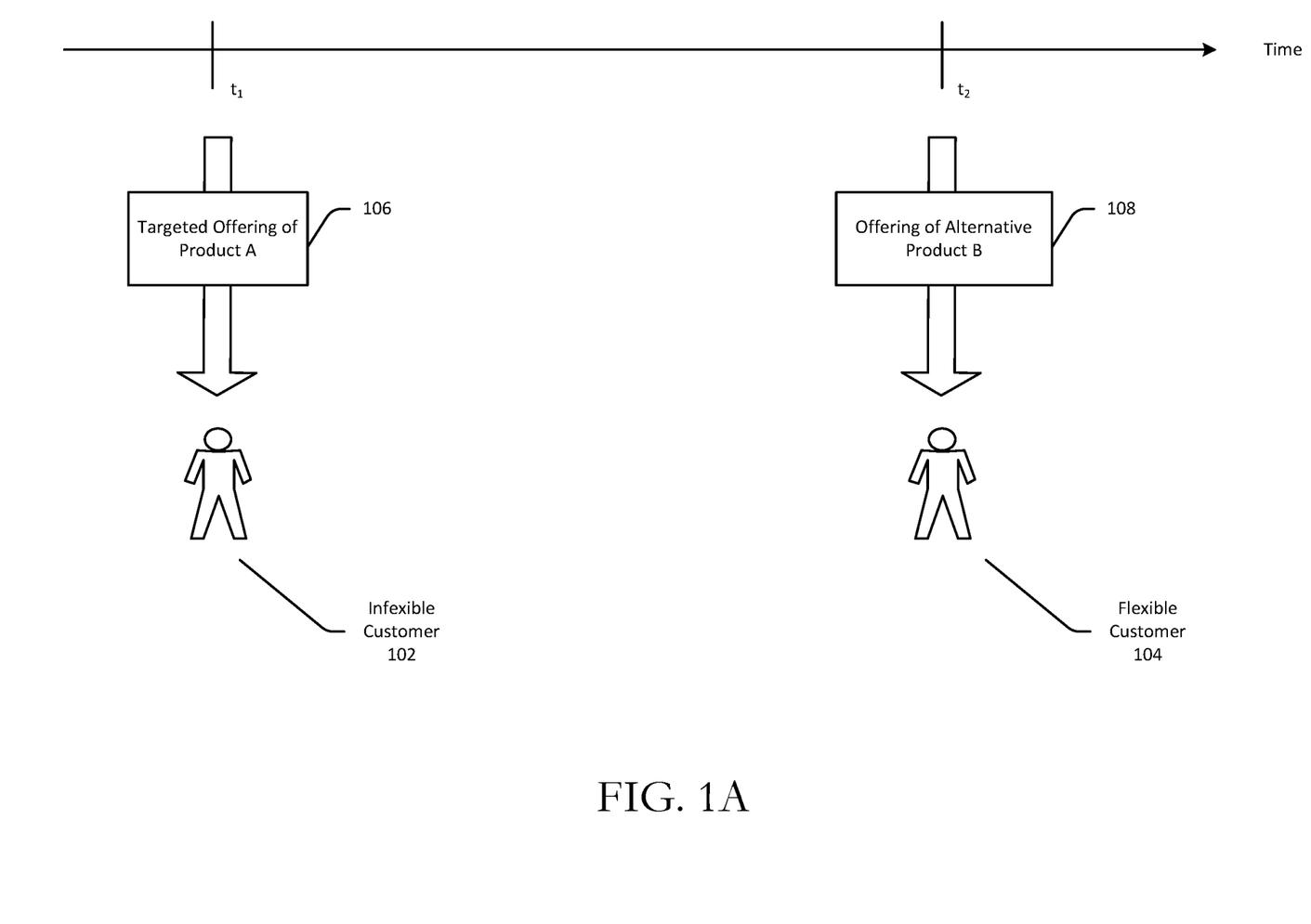
FIG. 1A is a schematic depiction of a scenario where the timing of product offerings is determined based on purchasing behavior of customers in accordance with one or more example embodiments of the disclosure.
Figure 1B:
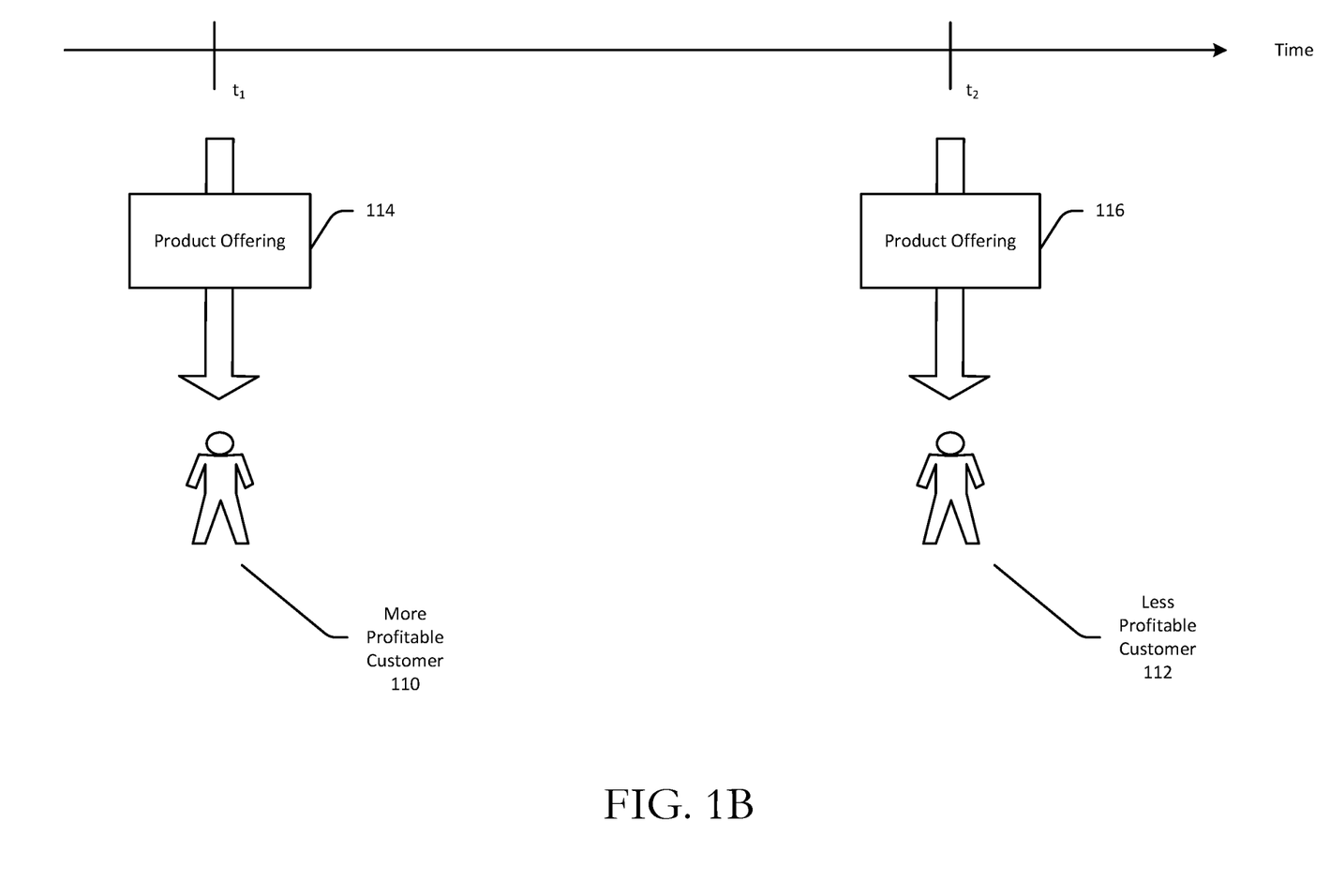
FIG. 1B is another schematic depiction of another scenario where the timing of product offerings is determined based on purchasing behavior of customers in accordance with one or more example embodiments of the disclosure.
Figure 1C:
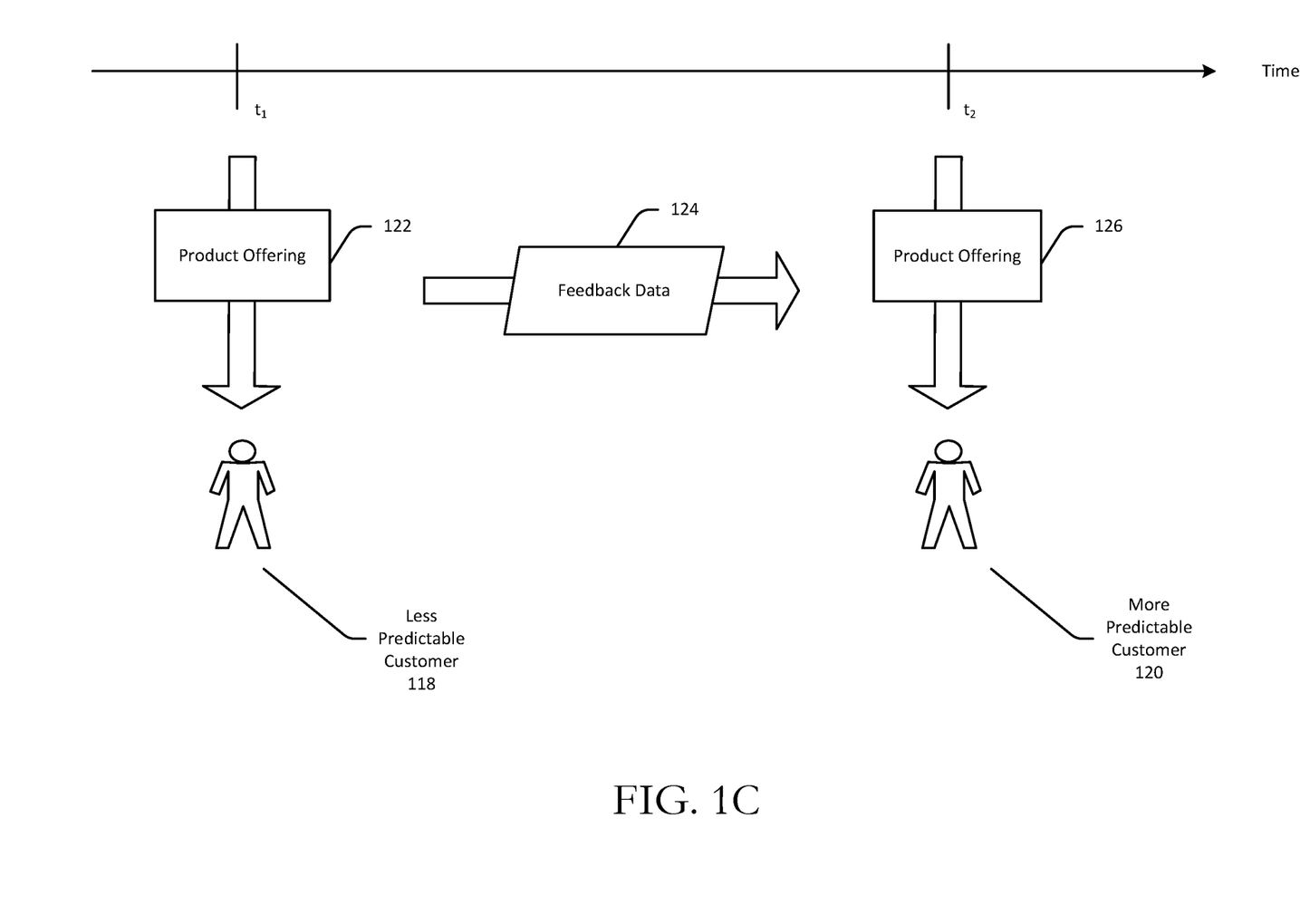
FIG. 1C is another schematic depiction of another scenario where the timing of product offerings is determined based on purchasing behavior of customers in accordance with one or more example embodiments of the disclosure.

FIGS. 1A, 1B and 1C are schematic depictions of scenarios where controlling the timing with which customers with different purchasing behavior are targeted can yield advantages over conventional RM systems with respect to inventory usage. Referring first to FIG. 1A, a scenario is depicted in which an inflexible customer 102 is prioritized over a flexible customer 104 with respect to product offerings. For example, inflexible customer 102 may be a customer who has demonstrated (based on historical purchase data, customer preferences, or the like) a strong preference for Product A, which may be, for example, a smartphone manufactured by a particular company, a particular smartphone model, or the like. The flexible customer 104, on the other hand, may not have a demonstrated preference for Product A. The flexible customer 104 may, for example, have no demonstrated preference for any particular smartphone model or manufacturer.

In order to ensure that Product A is made available to the inflexible customer 102 while Product A is still available in inventory, a seller may target the inflexible customer 102 with a sales offering 106 of Product A (or marketing messaging relating to Product A) at time $t_1$ prior to a time $t_2$ at which the seller may target the flexible customer 104 with an offering of Product B as an alternative to Product A. If, for example, inventory of Product A is scarce, and the inflexible customer 102 is only willing to purchase Product A or otherwise exhibits significantly reduced demand for any alternative to Product A, it is to the seller's advantage to first target the inflexible customer 102 with the Product A offering 106 at an earlier time $t_1$ when Product A is still available in the inventory, and later target the flexible customer 104 with the alternative Product B offering 108 at time $t_2$ when Product A may be depleted from the inventory. Thus, example embodiments of the disclosure provide for a customer selection policy that allows the inflexible customer 102 to be selected for the Product A offering 106 when Product A is still available in the inventory and prior to the flexible customer 104 being targeted with the alternative Product B offering 108. It should be appreciated that the flexible customer 104 may also be targeted with an offering of Product A at time $t_2$ if it is determined that Product A is still available in the inventory. On the other hand, if Product A remains available in the inventory at time $t_2$, it may be to the seller's advantage to reserve offerings of Product A for other inflexible customer(s) who may exist.

FIG. 1B depicts another example scenario in which a more profitable customer 110 is prioritized over a less profitable customer 112 with respect to product offerings. Different customers (e.g., customer 110 and customer 112) may demonstrate a different willingness to pay for the same item, and in certain scenarios, multiple products with different profit margins may draw from the same pool of inventory for some common component. If, for example, inventory is scarce, it is to the seller's advantage to have the more profitable customer 110 make his/her decision more quickly. Accordingly, example embodiments of the disclosure provide for a customer selection policy that allows for the more profitable customer 110 to be targeted with a product offering 114 at time $t_1$ for a product with a higher profit margin or for a product for which the more profitable customer 110 is willing to pay a premium, while the product is still available in inventory. Time $t_1$ is prior to a time $t_2$ at which the less profitable customer 112 is targeted with a product offering 116.

In certain example embodiments, the same product may be offered in connection with the product offering 114 and the product offering 116, but the more profitable customer 110 may be willing to pay more for the offered item than the less profitable customer 112. In other example embodiments, a product with a higher profit margin may be offered in connection with the product offering 114 because the more profitable customer 110 may have demonstrated a stronger affinity for the product than the less profitable customer 112. In this manner, the product may be offered to the customer who has demonstrated a greater likelihood to purchase the product while the product is still available in inventory. If such a product is depleted from the inventory at time $t_2$, a product with a lower profit margin may be offered to the less profitable customer 112 as part of product offering 116.

FIG. 1C depicts another example scenario in which the outcome of a product offering made to a first customer is used to inform the timing of a subsequent product offering made to a second customer. The first customer may be a less predictable customer 118 whose purchasing behavior is difficult to predict, but whose decision may significantly affect the overall inventory balance. In this example scenario, the less predictable customer 118 may be targeted with a product offering 122 at time $t_1$. Feedback data 124 indicative of the purchase decision of the less predictable customer 122 may be then be captured and stored and utilized to determine the customer (e.g., the more predictable customer 120) who will be targeted with a product offering 126 at time $t_2$, the timing of the product offering 126 (e.g., time $t_2$), and/or the specific product that will be offered in connection with the product offering 126. The less predictable customer 118 may be selected to receive the product offering 122 earlier due to the value of the information gathered from the customer's 118 purchase decision in determining the timing of the product offering 126, the product to offer as part of the product offering 126, and/or the customer to whom the product offering 126 is to be made.

Figure 2:
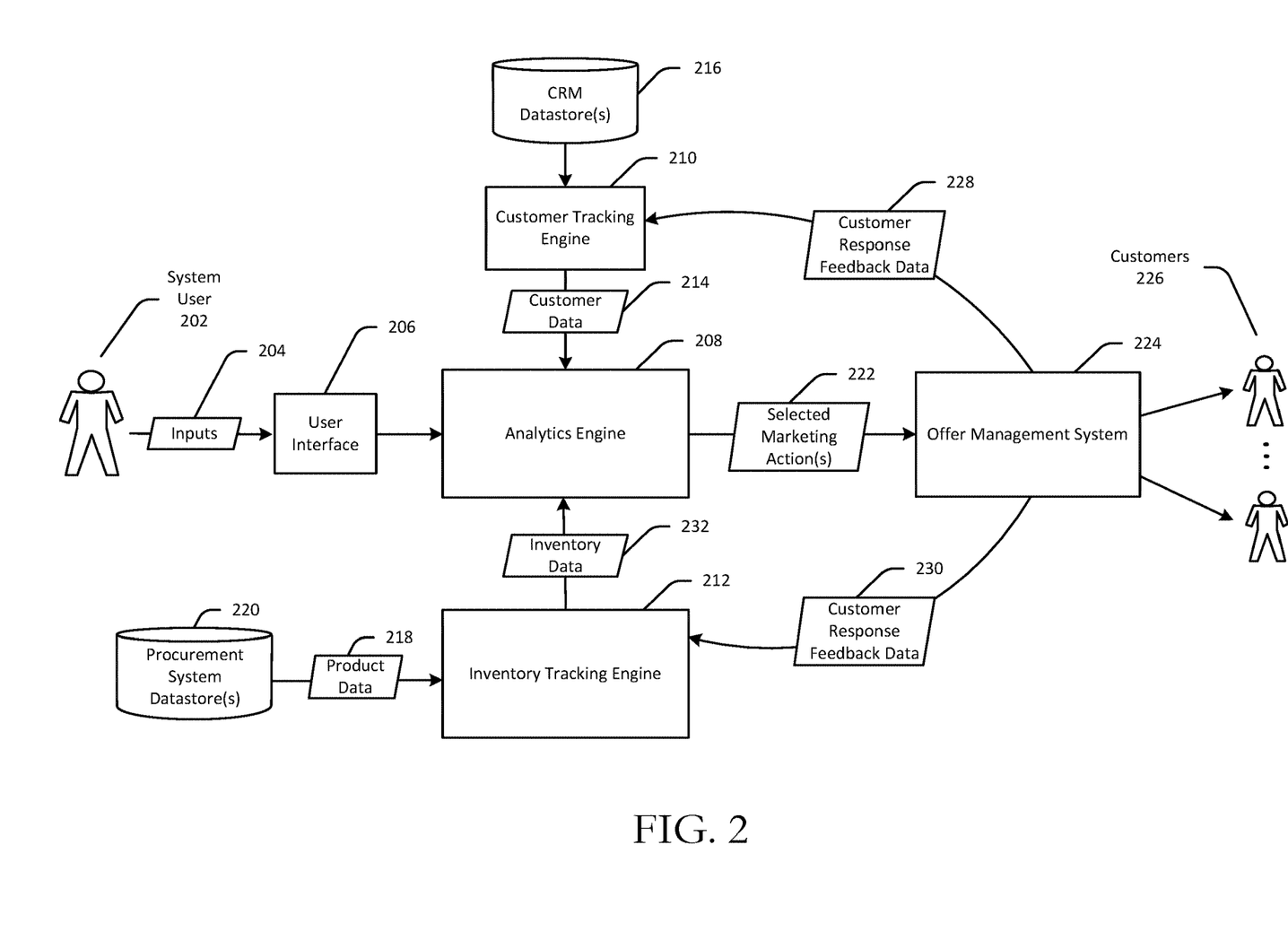
FIG. 2 is a schematic block diagram illustrating various components of a customer selection system configured to implement a customer selection policy in accordance with one or more example embodiments of the disclosure.
Figure 3:
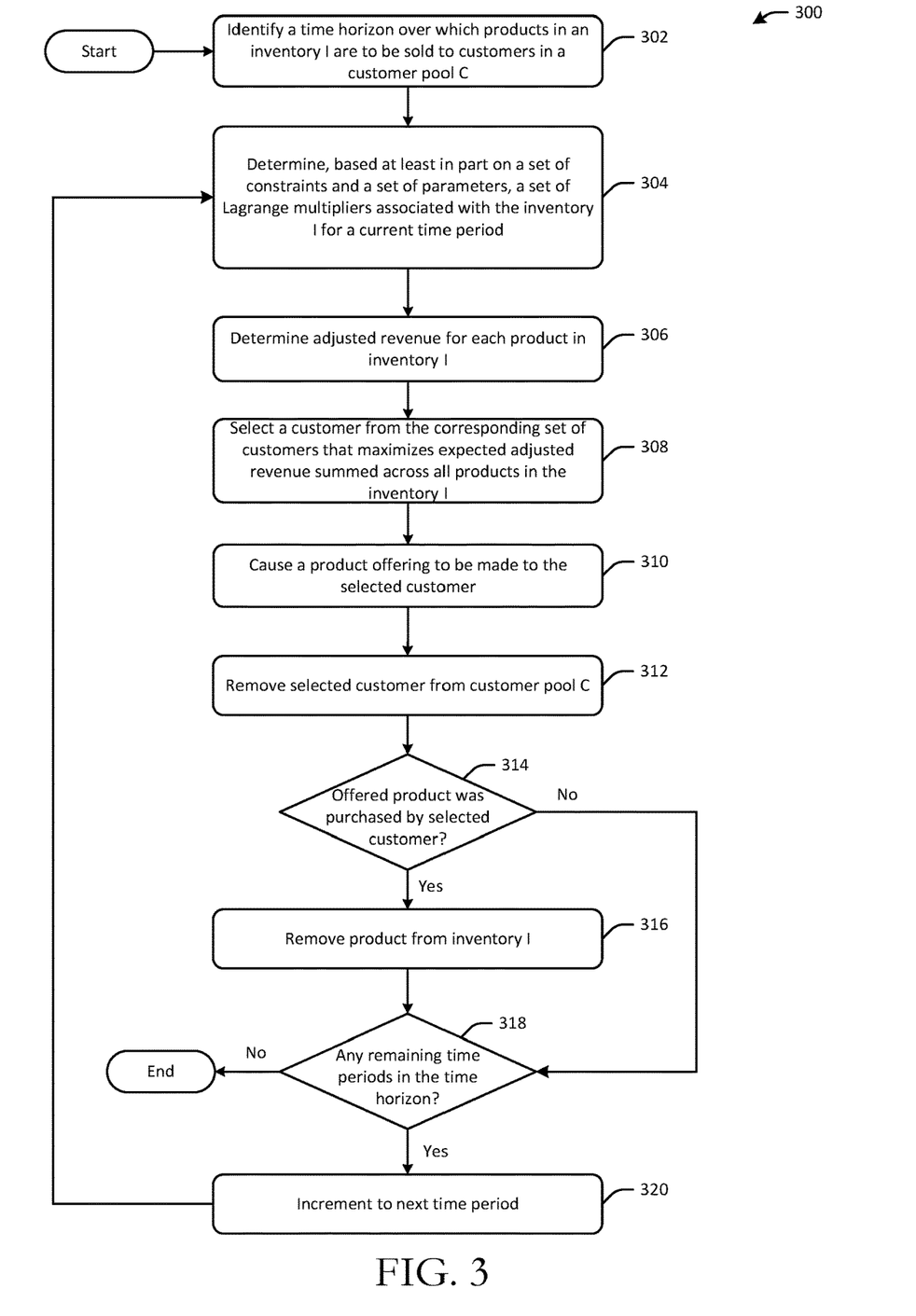
FIG. 3 is a process flow diagram of a method for selecting a respective customer for each of multiple time periods in a time horizon to receive a respective product offering in accordance with one or more example embodiments of the disclosure.

FIG. 2 is a schematic block diagram illustrating various components of a customer selection system configured to implement a customer selection policy in accordance with one or more example embodiments of the disclosure. FIG. 3 is a process flow diagram of a method 300 for selecting a respective customer for each of multiple time periods in a time horizon to receive a respective product offering in accordance with one or more example embodiments of the disclosure. FIGS. 2 and 3 will be described in conjunction with one another hereinafter. One or more operations of the method 300 may be performed by one or more engines, or more specifically, by one or more program modules or sub-modules forming part of such engine(s). An engine, or more specifically, a module contained therein, which may itself contain or be a collection of one or more sub-modules, may include computer-executable instructions that when executed by a processing circuit may cause one or more operations to be performed. A processing circuit may include one or more processing units or nodes. Computer-executable instructions may include computer-executable program code that when executed by a processing unit may cause input data contained in or referenced by the computer-executable program code to be accessed and processed to yield output data. Any engine or module described herein may be implemented in any combination of software, hardware, and/or firmware.

A customer selection system in accordance with one or more example embodiments of the disclosure may include an analytics engine 208, a customer tracking engine 210, and an inventory tracking engine 212. The analytics engine 208 may include computer-executable instructions that responsive to execution by a processing circuit may cause one or more operations of the method 300 to be performed. For example, the analytics engine 208 may be executed to formulate and solve a CSLP and associated heuristic to implement a dynamic customer selection policy that identifies an order in which customers are to be approached with marketing messaging/product offerings over multiple time periods of a time horizon. The customer tracking engine 210 may include computer-executable instructions that responsive to execution by a processing circuit may cause customer data 214 to be captured, stored, and provided as input to the analytics engine 208. In certain example embodiments, the customer tracking engine 210 may access or otherwise receive at least a portion of the customer data 214 from one or more customer relationship management (CRM) data stores 216. The customer data 214 may include, for example, historical purchase data, online customer search and browsing data, feedback data indicative of purchase outcomes associated with prior marketing messaging or product offerings targeted to customers, and so forth. The inventory tracking engine 212 may include computer-executable instructions that responsive to execution by a processing circuit may cause product availability data 218 to be accessed (e.g., received) from one or more procurement system data store(s) 220. The inventory tracking engine 212 may generate inventory data 232 based at least in part on the product availability data 218. The inventory data 232 may track and update product availability in inventory and may be provided as input to the analytics engine 208.

The customer selection system may further include a user interface 206 via which a system user 202 may provide various inputs 204 to the analytics engine 208. The inputs 204 may include, for example, a set of parameters and a set of constraints. The set of parameters may include, for example, an initial inventory I that identifies a number of products $I_j$ for each product $j \in J$ (e.g., I may be a vector with each element in the vector representing the inventory position of a corresponding product j); a respective marginal profit/net revenue $r_j$ generated for each product j; an initial pool of customers C; a respective probability $p_{ij}$ that a customer $i \in C$ purchases a product $j \in J$; and a finite, k period, sales horizon $\{k, \ldots, 1\}$. The set of constraints will be described in more detail later in this disclosure.

Referring now to FIGS. 2 and 3 in conjunction with one another, at block 302, the analytics engine 208 may identify a time horizon over which products in the inventory I are to be offered for sale or otherwise marketed to customers in the customer pool C. The time horizon may be the finite, k period, sales horizon $\{k, \ldots, 1\}$ received as an input 204. Via the processing of operations 304-320 of the method 300, the analytics engine 208 may then proceed to iteratively compute solutions to a dynamic optimization problem to select one customer to target for sale in each time period of the k period time horizon $\{k, \ldots, 1\}$.

More specifically, at block 304, the analytics engine 208 may be executed to determine, for a current time period (which is the kth time period in an initial iteration), and based at least in part on the set of parameters and the set of constraints received as inputs 204, a set of $\lambda_j$s, where each $\lambda_j$ represents an incremental impact on the total value of the inventory I by a corresponding product $j \in J$. More specifically, each $\lambda_j$ may represent how much inventory value is generated by increasing an amount of product j in the inventory I by a unit increment.

In particular, the analytics engine 208 may formulate a dynamic CSP according to which a seller selects a customer in the kth time period that maximizes $V_k(C, I)$, where $V_k(C, I) = \max_{i \in C} V_{k-1}(C/\{i\}, I) + \Sigma_{j \in J} 1\{I_j > 0\} p_{ij}[r_j + V_{k-1}(C/\{i\}, I - e_j) - V_{k-1}(C/\{i\}, I)]$. $V_k(C, I)$ may represent the value/utility in the kth time period, and may be recursively defined in terms of the customer i that maximizes the sum of: 1) the value/utility in time period k−1 (with the customer i removed from the customer pool C) and 2) a first quantity that represents the sum, across all products $j \in J$, of the probability the customer i purchases product j multiplied by a second quantity. The second quantity may be the sum of the marginal revenue/profit associated with product j and the value/utility obtained in time period k−1 (with the customer i removed from the customer pool C and the amount of product j in the inventory I reduced) subtracted by the value/utility that would be obtained in time period k−1 with the customer i removed from the customer pool C, but the inventory I remaining unchanged. The value/utility that would be obtained in time period k−1 with the customer i removed from the customer pool C, but the inventory I remaining unchanged (i.e. the amount of product j in the inventory I not being reduced) may represent the opportunity cost of offering product j to customer i in time period k−1. The term $e_j$ in the above formulation may represent a vector that has a value of 0 corresponding to each product in J other than product j and a value of 1 corresponding to product j.

As previously noted, the above dynamic CSP may be recursively defined such that the value/utility for a current time period (e.g., the kth time period) is defined in terms of the customer i who maximizes the value/utility of the immediately subsequent time period (e.g., time period k−1), which in turn may be defined in terms of the customer i who maximizes the value/utility of the next immediately subsequent time period (e.g., time period k−2). As such, the recursive nature of the dynamic CSP formulation may, in certain example embodiments, make the problem difficult to solve. Accordingly, in certain example embodiments, the analytics engine 208 may be configured to approximate a solution to the dynamic CSP by first computing a solution to a bounded CSLP for the current time period based on a set of constraints, and then applying a heuristic to reflect the dynamic nature of the recursively defined CSP.

The CSLP may be defined as follows: $\max_{x \in R+^{|C|}, z \in R+^{|J|}} \Sigma_{j \in J} r_j z_j$, where $z_j$ represents an amount of product j that is sold. The CSLP may be bounded by the set of constraints previously referred to, which may include the following: constraint 1: $z_j \leq I_j \ \forall \ j \in J$ (which indicates that the amount of product j that is sold cannot exceed the amount of product j in inventory I); $z_j \leq \Sigma_{i \in C} p_{ij} x_i, \ \forall \ j \in J$ (where $x_i$ represents an "amount" (potentially fractional) of customer i and where this constraint indicates that the amount of product j that is sold cannot exceed the sum across all customers in customer pool C of the "amount" of each customer multiplied by the corresponding respective probability of purchase of product j); constraint 3: $\Sigma_{i \in C} x_i \leq$ # remaining time periods (which indicates that the total amount of customers selected cannot exceed the number of remaining time periods, reflecting that at most one customer can be selected for each time period); and constraint 4: $x_i \leq 1 \ \forall \ i \in C$ (which indicates that while fractional customer selections are permissible, greater than a whole customer cannot be selected).

The analytics engine 208 may, at block 304, compute a solution to the above-described CLSP based on the above-described constraints to obtain the set of $\lambda_j$s for the current time period, where each $\lambda_j$ represents an incremental impact on the total value of the inventory I by a corresponding product $j \in J$. The solution $V^D$ of the above-described CSLP may be an upper bound of $V_k(C, I)$. More formally, if $V_\theta^*$ represents an optimal value of $V_k(C, I)$, with I, k, and C scaled by θ, then $$\lim_{\theta \to \infty} V_\theta^* = V^D.$$

After determining the set of Lagrange multipliers for the current time period at block 304, the analytics engine 208 may be executed at block 306 to determine a respective adjusted revenue for each product j in inventory I. More specifically, the analytics engine 208 may be executed to generate a $|J|$-vector λ containing each Lagrange multiplier $\lambda_j$ for the $|J|$ inventory constraints. The $|J|$-vector λ may represent the opportunity cost (e.g., the loss in value/utility) associated with each product $j \in J$ if it was to be offered and purchased by a customer in the current time period. The analytics engine 208 may then compute a respective adjusted revenue $\hat{r}$ for each product j, which is equal to $r_j - \lambda_1$ if $I_j > 0$ or 0 if $I_j \leq 0$.

At block 308, the analytics engine 208 may then select a particular customer i from the pool of candidate customers C that maximizes the expected adjusted revenue summed across all products in the inventory I. More specifically, the analytics engine 208 may select customer $i \in C$ that maximizes $\Sigma_{j \in I} p_{ij} \hat{r}_j$.

Upon selecting customer i at block 308, the analytics engine 208 may provide an indication of the selected customer as well as an indication of one or more marketing actions 222 (e.g., a product to be offered to selected customer) to an offer management system 224 to cause the indicated marketing action(s) (e.g., the product offering) to be made to the selected customer for the current time period at block 310. In particular, the offer management system 224 may execute the marketing action(s) 222. The customer selected for the current time period may be one of a set of customers 226, where the set of customers 226 includes the respective customer selected for targeting in each time period.

In certain example embodiments, the customer selected to target for any given time period may be provided the opportunity to choose from all available products. In such a scenario, the timing of the marketing action(s) 222 may be controlled so as to induce a purchase by the selected customer, without intending to steer the customer towards any specific product. In other example embodiments, a seller may determine a product assortment that represents a subset of the full set of available products J and offer only the products in the subset to the customer. The selected subset of products may vary from one customer to the next. In certain example embodiments, the subset of products to select for offering to a selected customer may be determined by solving an assortment optimization problem for the selected customer using reduced costs. More formally, for a selected customer i, a subset S in J may be determined such that $\Sigma_{j \in S} \Sigma_{i \in C} p_{ij} \hat{r}_j$ is maximized.

While the above-described formulation of the dynamic CSP optimization problem indicates that one customer is selected to receive the marketing action(s) 222 for each time period, it should be appreciated that the dynamic CSP may be reformulated to allow for selection of m customers for each time period, where m>1. For example, a set of customers may be selected on a weekly basis to receive marketing action(s) 222. The set of customers selected for any given week may be updated based on the outcomes associated with the set of customers targeted in the previous week. The CSLP described earlier permits selection of multiple customers per time period since all customers are chosen at the same time. In particular, by setting the number of time periods equal to the total number of customers selected (k*m for k periods of m customers), a set of m customers may be selected for each time period. The dynamic CSP may then be reformulated to allow m simultaneous selections.

Depending on the outcome of targeting the marketing action(s) 222 to the selected customer, the analytics engine 208 may update at least one parameter and/or at least one constraint for a subsequent time period. In particular, the offer management system 224 may provide customer response feedback data 228, 230 to the customer tracking engine 210 and the inventory tracking engine 212, respectively. The customer response feedback data 228, 230 may indicate, for example, the outcome of the marketing action(s) 222 targeted to the selected customer (e.g., whether the selected customer purchased an offered product). At block 312, the analytics engine 208 may update the customer pool parameter C by removing the customer i selected to receive the marketing action(s) 222 for the current time period from the customer pool C to obtain a new customer pool C=C−{i}.

Thereafter, the inventory tracking engine 212 may determine, at block 314, whether a product offered to the selected customer as part of the marketing action(s) 222 was purchased by the customer. More specifically, the inventory tracking engine 212 may update the inventory data 232 based at least in part on the customer response feedback data 230 to indicate whether the offered product was purchased. In response to a positive determination at block 314 (if, for example, the offered product was purchased), the inventory tracking engine 212 may remove the purchased product from the inventory I by decrementing the amount of the product accordingly in the inventory data 232 at block 316.

From block 316, the method 300 may proceed to block 318, where the analytics engine 208 may determine whether there are any remaining time periods in the k period time horizon. The method 300 may also proceed directly to block 318 from block 314 in response to a negative determination at block 314. In response to a positive determination at block 318 indicating that there are remaining time period(s), the analytics engine 208 may increment to the next time period, and the method 300 may proceed iteratively from the subsequent (and now current) time period. For example, the analytics engine 208 may increment from the kth time period to the (k−1)th time period, from the (k−1)th time period to the (k−2)th time period, etc. at block 320. That is, the CSLP previously described above may again be solved using the new customer pool C having the customer i selected for the prior time period eliminated therefrom and using an inventory vector I in which the amount of the product offered to the customer in the prior time period may be decremented (if the product was purchased by the customer in the prior time period). Constraints (1) and (3) may be updated as well based on a change in the available inventory (if applicable) and the number of remaining time periods, respectively. Thereafter, once the solution to the CSLP for the subsequent (and now current) time period is determined, the operations 306-308 associated with implementing the dynamic heuristic may again be performed to select a customer for the subsequent (and now current) time period. In this manner, the above-described process may be performed iteratively for each time period in the k period time horizon until a respective customer is selected to receive respective marketing action(s) for each time period. That is, the method 300 may proceed iteratively until a negative determination is made at block 318, at which point, the method 300 may end.

In example embodiments of the disclosure, a solution to the formulation of the dynamic CSP described above yields a total value ($V^*$) that is greater than a total value achieved by a greedy solution ($V^G$). As an example, assume that a number of time periods k in the time horizon is 2. Further assume that there are 2 products $j \in J$, the inventory corresponding to the products in J is given by I=[1, 1], and the marginal profit/net revenue generated for each product $j \in J$ is given by r=[1, 2]. Finally, assume that the customer pool C includes 3 customers having the following respective probabilities of purchase of each product j: Customer 1 ($c_1$): (0.4, 0.6); Customer 2 ($c_2$): (0.4, 0.6); and Customer 3 ($c_3$): (0, 1). That is, customer $c_1$ and customer $c_2$ are each associated with a 40% chance of purchasing product 1 and a 60% chance of purchasing product 2, and customer $c_3$ is associated with a 0% chance of purchasing product 1 and a 100% chance of purchasing product 2.

Referring to the greedy solution first, the customer expected to provide the highest value in the first time period would be selected for the first time period. Thus, under the greedy solution, customer $c_3$ would be selected for the first time period. Customer $c_3$ consumes product 2 for a value of 2 units. In the second time period (the last time period), only customer $c_1$ and $c_2$ remain. Each of customers $c_1$ and $c_2$ have a 40% chance of selecting product 1, thereby providing an additional unit of value. However, each of customers $c_1$ and $c_2$ also have a 60% of selecting product 2 (which is now out of stock), thereby providing no value. Accordingly, the total value over the two time periods is given by $0.4*(2+1)+0.6*(2+0)=2.4=V^G$.

Referring now to the optimal solution provided by the dynamic CSP optimization according to example embodiments of the disclosure, either customer $c_1$ or customer $c_2$ would be selected in the first time period. Thus, there is a 40% chance of obtaining a total value of 3 since there is a 40% chance that the customer selected in the first time period (either customer $c_1$ or customer $c_2$) selects product 1, thereby providing a value of 1, and there is a 100% chance that the customer selected in the second time period (customer $c_3$) selects product 2, thereby providing a value of 2. Thus, a total value of 3 is achieved when customer $c_1$ or customer $c_2$ selects product 1 in the first time period.

However, referring again to the first time period, there is a 60% chance that the selected customer (either customer $c_1$ or customer $c_2$) selects product 2 in the first time period. If so, the maximum value that can be obtained for the second time period is 0.4 since product 2 has been depleted from the inventory, and there is only a 40% that the highest value obtainable value (a unit 1 from consumption of product 1) in the second time period is achieved. On the other hand, there is a 60% chance that no value is achieved in the second time period since there is a 60% chance that customer $c_3$ is selected in the second time period, and customer $c_3$ has a 0% chance of selecting product 1. Thus, in summary, under the optimal solution in accordance with example embodiments of the disclosure, $V^*=0.4*(1+2)+0.6*(2+(0.4*1+0.6*0))=0.4*3+0.6*2.4=2.64$. Therefore, the optimal solution of the dynamic CSP in accordance with example embodiments of the disclosure yields greater value $V^*$ than the value yielded by the greedy solution ($V^G$).

Example embodiments of the disclosure include or yield various technical features, technical effects, and/or improvements to technology. For instance, example embodiments of the disclosure provide the technical effect of a customer selection policy that identifies an order in which customers are to be selected to receive targeted product offerings in order to efficiently utilize a seller's available inventory. This technical effect is achieved as a result of the technical features of formulating a dynamic CSP and approximating a solution to the CSP using a CSLP and an associated heuristic that accounts for the effects that customer outcomes in prior time periods have on subsequent time periods. Thus, the above-described technical features and their associated technical effects yield an improvement to conventional RM technology. It should be appreciated that the above examples of technical features, technical effects, and improvements to technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
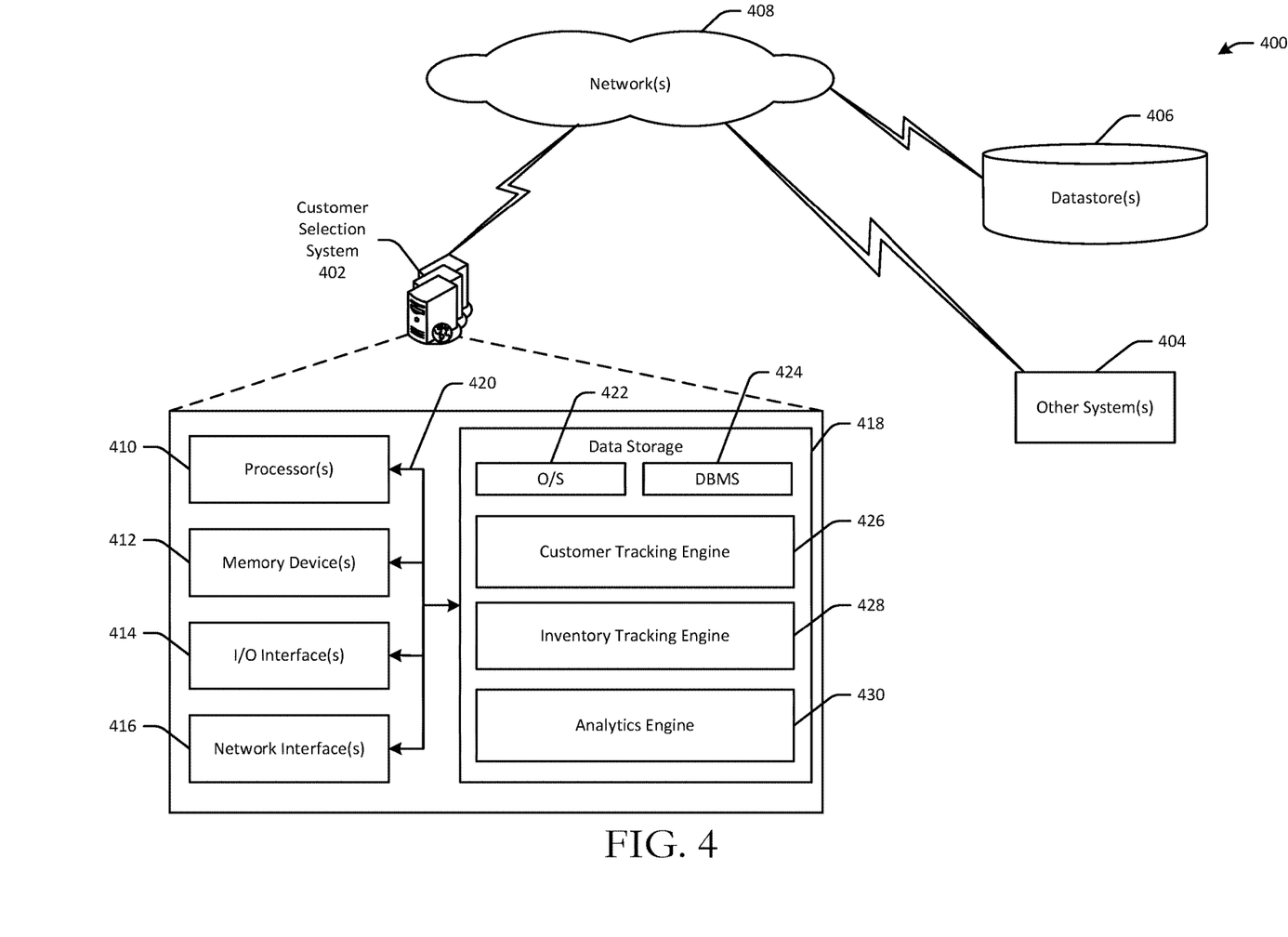
FIG. 4 is a schematic diagram of an illustrative networked architecture in accordance with one or more example embodiments of the disclosure.

FIG. 4 is a schematic diagram of an illustrative networked architecture 400 in accordance with one or more example embodiments of the disclosure in accordance with one or more example embodiments of the disclosure. The networked architecture 400 may include a customer selection system 402 that may include one or more customer selection servers. The customer selection system 402 may be configured to communicate with one or more other systems 404 via one or more networks 408. The other system(s) 404 may include, for example, the offer management system 224, a procurement system that includes or otherwise controls access to the procurement system data store(s) 220, a CRM system that includes or otherwise controls access to the CRM data store(s) 216, and so forth. In addition, the customer selection system 402 may be configured to access one or more data stores 406 over the network(s) 408. The data store(s) 406 may include the procurement system data store(s) 220, the CRM data store(s) 216, or the like. Further, in certain example embodiments, the data store(s) 406 may include one or more data store(s) that form part of the customer selection system 402 and that store any portion of the inputs 204, the product data 214, the inventory data 232, the customer data 214, the customer response feedback data 228, 230, and so forth. It should be appreciated that functionality described in connection with the customer selection system 402 may be distributed across multiple customer selection servers in a distributed fashion.

The network(s) 408 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 408 may have any suitable communication range associated therewith and may include, for example, global networks (e.g., the Internet), metropolitan area networks (MANs), wide area networks (WANs), local area networks (LANs), or personal area networks (PANs). In addition, the network(s) 408 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the customer selection system 402 may include one or more processors (processor(s)) 410, one or more memory devices 412 (generically referred to herein as memory 412), one or more input/output ("I/O") interface(s) 414, one or more network interfaces 416, and data storage 418. The customer selection system 402 may further include one or more buses 420 that functionally couple various components of the customer selection system 402.

The bus(es) 420 may include at least one of a system bus, a memory bus, an address bus, or a message bus, and may permit exchange of information (e.g., data (including computer-executable code), signaling, etc.) between various components of the customer selection system 402. The bus(es) 420 may include, without limitation, a memory bus or a memory controller, a peripheral bus, an accelerated graphics port, and so forth. The bus(es) 420 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 412 of the customer selection system 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 412 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 412 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 412 and the data storage 418, removable and/or non-removable, are examples of computer-readable storage media (CRSM) as that term is used herein.

The data storage 418 may store computer-executable code, instructions, or the like that may be loadable into the memory 804 and executable by the processor(s) 410 to cause the processor(s) 410 to perform or initiate various operations. The data storage 418 may additionally store data that may be copied to memory 412 for use by the processor(s) 410 during the execution of the computer-executable instructions. Moreover, output data generated as a result of execution of the computer-executable instructions by the processor(s) 410 may be stored initially in memory 412 and may ultimately be copied to data storage 418 for non-volatile storage.

More specifically, the data storage 418 may store one or more operating systems (O/S) 422; one or more database management systems (DBMS) 424 configured to access the memory 412 and/or one or more of the data stores 406; and one or more program modules, applications, engines, computer-executable code, scripts, or the like such as, for example, a customer tracking engine 426, an inventory tracking engine 428, and an analytics engine 430. Any of the components depicted as being stored in data storage 418 may include any combination of software, firmware, and/or hardware. The software and/or firmware may include computer-executable instructions (e.g., computer-executable program code) that may be loaded into the memory 412 for execution by one or more of the processor(s) 410 to perform any of the operations described earlier in connection with correspondingly named modules.

Although not depicted in FIG. 4, the data storage 418 may further store various types of data utilized by components of the customer selection system 402 (e.g., the inputs 204, the product data 218, the inventory data 232, the customer data 214, the customer response feedback data 228, 230, etc.). Any data stored in the data storage 418 may be loaded into the memory 412 for use by the processor(s) 410 in executing computer-executable instructions. In addition, any data stored in the data storage 418 may potentially be stored in one or more external data stores (e.g., one or more of the data stores 406) and may be accessed via the DBMS 424 and loaded in the memory 412 for use by the processor(s) 410 in executing computer-executable instructions.

The processor(s) 410 may be configured to access the memory 412 and execute computer-executable instructions loaded therein. For example, the processor(s) 410 may be configured to execute computer-executable instructions of the various program modules, applications, engines, or the like of the customer selection system 402 to cause or facilitate various operations to be performed in accordance with one or more embodiments of the disclosure. The processor(s) 410 may include any suitable processing unit capable of accepting data as input, processing the input data in accordance with stored computer-executable instructions, and generating output data. The processor(s) 410 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 410 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 410 may be capable of supporting any of a variety of instruction sets.

Referring now to other illustrative components depicted as being stored in the data storage 418, the O/S 422 may be loaded from the data storage 418 into the memory 412 and may provide an interface between other application software executing on the customer selection system 402 and hardware resources of the customer selection system 402. More specifically, the O/S 422 may include a set of computer-executable instructions for managing hardware resources of the customer selection system 402 and for providing common services to other application programs (e.g., managing memory allocation among various application programs). In certain example embodiments, the O/S 422 may control execution of one or more of the program modules depicted as being stored in the data storage 418. The O/S 422 may include any operating system now known or which may be developed in the future including, but not limited to, any server operating system, any mainframe operating system, or any other proprietary or non-proprietary operating system.

The DBMS 424 may be loaded into the memory 412 and may support functionality for accessing, retrieving, storing, and/or manipulating data stored in the memory 412, data stored in the data storage 418, and/or data stored in the data store(s) 406. The DBMS 424 may use any of a variety of database models (e.g., relational model, object model, etc.) and may support any of a variety of query languages. The DBMS 424 may access data represented in one or more data schemas and stored in any suitable data repository. The data store(s) 406 that may be accessible by the customer selection system 402 via the DBMS 424 may include, but are not limited to, databases (e.g., relational, object-oriented, etc.), file systems, flat files, distributed datastores in which data is stored on more than one node of a computer network, peer-to-peer network datastores, or the like. The data store(s) 406 may store various types of data including, without limitation, any of the types of data previously described. It should be appreciated that, in certain example embodiments, any external data store and/or any of the data residing thereon may additionally, or alternatively, be stored locally in the data storage 418.

Referring now to other illustrative components of the customer selection system 402, the input/output (I/O) interface(s) 414 may facilitate the receipt of input information by the customer selection system 402 from one or more I/O devices as well as the output of information from the customer selection system 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the customer selection system 402 or may be separate. The I/O devices may further include, for example, any number of peripheral devices such as data storage devices, printing devices, and so forth.

The I/O interface(s) 414 may also include an interface for an external peripheral device connection such as universal serial bus (USB), FireWire, Thunderbolt, Ethernet port or other connection protocol that may connect to one or more networks. The I/O interface(s) 414 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The customer selection system 402 may further include one or more network interfaces 416 via which the customer selection system 402 may communicate with any of the other system(s) 404 including any platforms, networks, devices, and so forth. The network interface(s) 416 may enable communication, for example, with the other system(s) 404 via one or more of the network(s) 408.

It should be appreciated that the engines depicted in FIG. 4 as being stored in the data storage 418 are merely illustrative and not exhaustive and that processing described as being supported by any particular engine may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the customer selection system 402 and/or hosted on other computing device(s) accessible via one or more of the network(s) 408, may be provided to support functionality provided by the engines depicted in FIG. 4 and/or additional or alternate functionality. Further, functionality may be modularized differently such that processing described as being supported collectively by a collection of engines depicted in FIG. 4 may be performed by a fewer or greater number of engines or program modules, or functionality described as being supported by any particular engine may be supported, at least in part, by another engine. In addition, engines that support the functionality described herein may form part of one or more applications executable across any number of computing devices of the customer selection system 402 in accordance with any suitable computing model such as, for example, a client-server model, a peer-to-peer model, and so forth. In addition, any of the functionality described as being supported by any of the engines depicted in FIG. 4 may be implemented, at least partially, in hardware and/or firmware across any number of devices.

It should further be appreciated that the customer selection system 402 may include alternate and/or additional hardware, software, or firmware components beyond those described or depicted without departing from the scope of the disclosure. More particularly, it should be appreciated that software, firmware, or hardware components depicted as forming part of the customer selection system 402 are merely illustrative and that some components may not be present or additional components may be provided in various embodiments. While various illustrative engines have been depicted and described as software modules stored in data storage 418, it should be appreciated that functionality described as being supported by the engines may be enabled by any combination of hardware, software, and/or firmware. It should further be appreciated that each of the above-mentioned engines may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine ay, in various embodiments, be provided at least in part by one or more other engines. Further, one or more depicted engines may not be present in certain embodiments, while in other embodiments, additional engines or modules not depicted may be present and may support at least a portion of the described functionality and/or additional functionality.

One or more operations of the method 300 may be performed by a customer selection system 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method 300 of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer implemented method for coordinating timing of targeted offerings to a customer pool, the method comprising:
determining a customer pool comprising a plurality of customers;
determining an inventory comprising a plurality of products or services;
determining an order of customers to be targeted from the customer pool to provide efficient use of the inventory available by selecting a first customer from the customer pool to target with a first product or service offering during a first time period of a plurality of time periods, wherein the first customer is an inflexible customer that has, via historical purchase data, a demonstrated preference for the first product or service offering and a reduced preference for a second product or service offering, wherein the second product or service offering is an alternative to the first product or service offering, wherein a number of time periods of the plurality of time periods equals a number of customers of the plurality of customers, wherein selecting the first customer comprises determining, based at least in part on a utility obtained in a time period subsequent to the first time period with the first customer removed from the customer pool, that selecting the first customer to target during the first time period optimizes allocation of the inventory across the plurality of time periods by determining that the first customer is a selection corresponding to a solution that maximizes a utility function for the first time period, wherein the utility function receives the customer pool and the inventory as inputs and the utility function is approximated by determining a set of Lagrange multipliers that maximizes expected revenue across the plurality of products or services in the inventory for the first time period and applying a heuristic to the set of Lagrange multipliers to select the first customer from the customer pool to target with the first product or service offering for the first time period;

causing the first customer to be targeted with the first product or service offering during the first time period, wherein targeting the first customer comprises causing a transmission of marketing information related to the first product to the first customer;

determining a customer outcome associated with offering the first product or service offering to the first customer; and selecting, based at least in part on the customer outcome, a second customer from the customer pool to target with the second product or service offering during a second time period of the plurality of time periods, wherein the second time period is subsequent to the first time period, wherein targeting the second customer comprises causing a transmission of marketing information related to the first product to the second customer, and wherein the second customer is a flexible customer that that does not have, via historical purchase data, a demonstrated preference for the first product or service offering.

2. The computer implemented method of claim 1, further comprising removing the first customer from the customer pool prior to selecting the second customer from the customer pool.

3. The computer implemented method of claim 1, wherein determining the customer outcome comprises determining that the first customer purchased a product or service associated with the first product or service offering of the plurality of products or services, the method further comprising adjusting the inventory by decrementing an amount of the product or service in the inventory prior to selecting the second customer from the customer pool.

4. The computer implemented method of claim 1, wherein applying the heuristic comprises determining that the first customer maximizes expected adjusted revenue across the plurality of products or services in the inventory as compared to each other customer in the customer pool.

5. A system for coordinating timing of targeted offerings to a customer pool, the system comprising:
at least one memory storing computer-executable instructions; and
at least one processor configured to access the at least one memory and execute the computer-executable instructions to:
determine a customer pool comprising a plurality of customers;
determine an inventory comprising a plurality of products or services;
determining an order of customers to be targeted from the customer pool to provide efficient use of the inventory available by select a first customer from the customer pool to target with a first product or service offering during a first time period of a plurality of time periods, wherein the first customer is an inflexible customer that has, via historical purchase data, a demonstrated preference for the first product or service offering and a reduced preference for a second product or service offering, wherein the second product or service offering is an alternative to the first product or service offering, wherein a number of time periods of the plurality of time periods equals a number of customers of the plurality of customers, wherein selecting the first customer comprises determining, based at least in part on a utility obtained in a time period subsequent to the first time period with the first customer removed from the customer pool, that selecting the first customer to target during the first time period optimizes allocation of the inventory across the plurality of time periods by determining that the first customer is a selection corresponding to a solution that maximizes a utility function for the first time period, wherein the utility function receives the customer pool and the inventory as inputs and the utility function is approximated by
determining a set of Lagrange multipliers that maximizes expected revenue across the plurality of products or services in the inventory for the first time period and
applying a heuristic to the set of Lagrange multipliers to select the first customer from the customer pool to target with the first product or service offering for the first time period;
cause the first customer to be targeted with the first product or service offering during the first time period, wherein targeting the first customer comprises causing a transmission of marketing information related to the first product to the first customer;
determine a customer outcome associated with offering the first product or service offering to the first customer; and
select, based at least in part on the customer outcome, a second customer from the customer pool to target with the second product or service offering during a second time period of the plurality of time periods, wherein the second time period is subsequent to the first time period, and wherein targeting the second customer comprises causing a transmission of marketing information related to the first product to the second customer, and wherein the second customer is a flexible customer that that does not have, via historical purchase data, a demonstrated preference for the first product or service offering.

6. The system of claim 5, wherein the at least one processor is further configured to executable the computer-executable instructions to remove the first customer from the customer pool prior to selecting the second customer from the customer pool.

7. The system of claim 5, wherein the at least one processor is configured to determine the customer outcome by executing the computer-executable instructions to determine that the first customer purchased a product or service associated with the first product or service offering of the plurality of products or services, and wherein the at least one processor is further configured to execute the computer-executable instructions to adjust the inventory by decrementing an amount of the product or service in the inventory prior to selecting the second customer from the customer pool.

8. The system of claim 5, wherein the at least one processor is configured to apply the heuristic by executing the computer-executable instructions to determine that the first customer maximizes expected adjusted revenue across the plurality of products or services in the inventory as compared to each other customer in the customer pool.

9. A computer program product for coordinating timing of targeted offerings to a customer pool, the computer program product comprising a non-transitory storage medium readable by a processing circuit, the storage medium storing instructions executable by the processing circuit to cause a method to be performed, the method comprising:

determining a customer pool comprising a plurality of customers;

determining an inventory comprising a plurality of products or services;

determining an order of customers to be targeted from the customer pool to provide efficient use of the inventory available by selecting a first customer from the customer pool to target with a first product or service offering during a first time period of a plurality of time periods, wherein the first customer is an inflexible customer that has, via historical purchase data, a demonstrated preference for the first product or service offering and a reduced preference for a second product or service offering, wherein the second product or service offering is an alternative to the first product or service offering, wherein a number of time periods of the plurality of time periods equals a number of customers of the plurality of customers, wherein selecting the first customer comprises determining, based at least in part on a utility obtained in a time period subsequent to the first time period with the first customer removed from the customer pool, that selecting the first customer to target during the first time period optimizes allocation of the inventory across the plurality of time periods by determining that the first customer is a selection corresponding to a solution that maximizes a utility function for the first time period, wherein the utility function receives the customer pool and the inventory as inputs and the utility function is approximated by determining a set of Lagrange multipliers that maximizes expected revenue across the plurality of products or services in the inventory for the first time period; and applying a heuristic to the set of Lagrange multipliers to select the first customer from the customer pool to target with the first product or service offering for the first time period;

causing the first customer to be targeted with the first product or service offering during the first time period, wherein targeting the first customer comprises causing a transmission of marketing information related to the first product to the first customer;

determining a customer outcome associated with offering the first product or service offering to the first customer; and selecting, based at least in part on the customer outcome, a second customer from the customer pool to target with the second product or service offering during a second time period of the plurality of time periods, wherein the second time period is subsequent to the first time period, and wherein targeting the second customer comprises causing the transmission of marketing information related to the first product to the second customer, and wherein the second customer is a flexible customer that that does not have, via historical purchase data, a demonstrated preference for the first product or service offering.

10. The computer program product of claim 9, the method further comprising removing the first customer from the customer pool prior to selecting the second customer from the customer pool.

11. The computer program product of claim 9, wherein determining the customer outcome comprises determining that the first customer purchased a product or service associated with the first product or service offering of the plurality of products or services, the method further comprising adjusting the inventory by decrementing an amount of the product of service in the inventory prior to selecting the second customer from the customer pool.

\* \* \* \* \*